US009465209B2

(12) United States Patent
Misago et al.

(10) Patent No.: US 9,465,209 B2
(45) Date of Patent: Oct. 11, 2016

(54) IMAGE DISPLAY APPARATUS AND METHOD FOR CONTROLLING IMAGE DISPLAY APPARATUS

(71) Applicant: JVC KENWOOD Corporation, Yokohama-shi (JP)

(72) Inventors: Chikara Misago, Sagamihara (JP); Jun Sasaki, Tama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 163 days.

(21) Appl. No.: 14/493,054

(22) Filed: Sep. 22, 2014

(65) Prior Publication Data

US 2015/0009550 A1    Jan. 8, 2015

Related U.S. Application Data

(63) Continuation of application No. PCT/JP2013/055692, filed on Mar. 1, 2013.

(30) Foreign Application Priority Data

Mar. 26, 2012  (JP) .................................. 2012-069357
Mar. 26, 2012  (JP) .................................. 2012-069358

(51) Int. Cl.
*G02B 26/08*     (2006.01)
*G03H 1/00*      (2006.01)
(Continued)

(52) U.S. Cl.
CPC ........... *G02B 26/0833* (2013.01); *B60K 35/00* (2013.01); *G02B 26/023* (2013.01);
(Continued)

(58) Field of Classification Search
CPC ............. G09G 3/003; H04N 13/0404; G02B 26/125; G02B 26/10; G02B 27/0172; G02B 27/2214; G02B 2027/0178; G02B 27/0101

USPC ...... 359/205.1, 196.1, 197.1, 618, 626, 621, 359/443, 454, 455, 630–634, 13–14; 345/7, 345/9; 264/1.1, 1.32, 2.7; 457/162, 164, 457/165, 226, 227, 554, 553, 555; 353/11–12, 28, 119; 349/11; 340/438, 340/980, 995.1, 815.47, 815.74; 310/49 R, 310/156.32, 156.33, 156.34, 156.35, 310/266–268, 156.02
See application file for complete search history.

(56) References Cited

U.S. PATENT DOCUMENTS

| 2009/0067057 A1 | 3/2009 | Sprague et al. |
| 2009/0201589 A1* | 8/2009 | Freeman ............ G02B 27/0103 359/630 |
| 2010/0245776 A1 | 9/2010 | Yamamoto |

FOREIGN PATENT DOCUMENTS

| JP | 2000-267621 A | 9/2000 |
| JP | 2006-119676 A | 5/2006 |

(Continued)

OTHER PUBLICATIONS

International Search Report in PCT International Application No. PCT/JP2013/055692, dated Apr. 2, 2013.

*Primary Examiner* — Dawayne A Pinkney
(74) *Attorney, Agent, or Firm* — Venable LLP; Michael A. Sartori

(57) ABSTRACT

An image display apparatus includes a light source unit, a scanning mirror unit that reflects and raster scans a light beam from the light source unit, a light source drive unit that drives the light source unit based on input image data, a microlens array that is arranged on an optical path between the light source unit and an eye of a user, and an optical sensor configured to detect the presence or absence of the microlens array. When the optical sensor fails to detect the presence of the microlens array, drive of the optical source is stopped.

8 Claims, 21 Drawing Sheets

(51) Int. Cl.
| | |
|---|---|
| *G03B 21/56* | (2006.01) |
| *G02B 27/14* | (2006.01) |
| *G09G 5/00* | (2006.01) |
| *G03B 21/14* | (2006.01) |
| *B60K 35/00* | (2006.01) |
| *G02B 27/01* | (2006.01) |
| *G02B 26/02* | (2006.01) |
| *H04N 9/31* | (2006.01) |

(52) U.S. Cl.
CPC ......... *G02B26/085* (2013.01); *G02B 26/0858* (2013.01); *G02B 27/01* (2013.01); *G02B 27/0101* (2013.01); *G02B 27/0172* (2013.01); *H04N 9/3129* (2013.01); *H04N 9/3155* (2013.01); *B60K 2350/2047* (2013.01); *B60K 2350/2052* (2013.01); *G02B 2027/0118* (2013.01); *G02B 2027/0123* (2013.01); *G02B 2027/0145* (2013.01)

(56) References Cited

FOREIGN PATENT DOCUMENTS

| | | |
|---|---|---|
| JP | 2009-137491 A | 6/2009 |
| JP | 2010-231063 A | 10/2010 |
| JP | 2010-539525 A | 12/2010 |
| WO | WO-2009/035783 A2 | 3/2009 |

* cited by examiner

140
IMAGE DISPLAY APPARATUS AND METHOD FOR CONTROLLING IMAGE DISPLAY APPARATUS

CROSS-REFERENCE TO RELATED APPLICATION(S)

This application is a continuation of International Application No. PCT/JP2013/055692, filed on Mar. 1, 2013 which claims the benefit of priority of the prior Japanese Patent Application No. 2012-069357, filed on Mar. 26, 2012 and Japanese Patent Application No. 2012-069358, filed on Mar. 26, 2012, the entire contents of which are incorporated herein by reference.

BACKGROUND OF THE INVENTION

1. Field of the Invention

The present invention relates to an image display apparatus and a method for controlling the image display apparatus, and more specifically, to a laser scanning projection display and a method for controlling the same.

2. Description of the Related Art

An image display apparatus is known that reflects laser light by a scanning mirror and displays images on a projection plane by the raster scanning of a light beam (Publication of Japanese Translation of PCT Application No. 2010-539525, for example). Specifically, the laser scanning projection display reciprocates the scanning mirror laterally to draw horizontal scanning lines, and simultaneously, reciprocates the scanning mirror vertically in accordance with the number of scanning lines constituting an image. Such an image display apparatus can be extremely downsized by using semiconductor laser diodes and MEMS mirrors, and its various application products have been so far developed such as head up displays and head mount displays.

The laser scanning projection display uses laser light and is characterized in that the laser light is guided to a retina of an eye and an image is focused on the retina. For this reason, the intensity of the laser light entering eyes should not exceed a prescribed standard.

The laser scanning projection display can be downsized, and excellent portability is expected. However, it can fall and be subjected to impacts and strong vibrations, or the like accordingly. Although mounting the laser scanning projection display on a vehicle is convenient, it can be subjected to strong shakes continuously while the vehicle is running depending on road surface conditions.

Some components can drop off or be damaged depending on the state of use.

SUMMARY OF THE INVENTION

It is an object of the present invention to at least partially solve the problems in the conventional technology.

The present invention provides an image display apparatus that includes: a light source unit configured to output a light beam; a light source drive unit configured to drive the light source unit based on input image data; a scanning mirror unit configured to reflect the light beam from the light source unit so as to raster scan the light beam by being driven in a main scanning direction and a sub-scanning direction; an exit pupil enlarger that is arranged on an optical path of the light beam output from the light source unit; and a detector configured to detect whether the exit pupil enlarger is present on the optical path.

The present invention also provides a method for controlling an image display apparatus that includes an exit pupil enlarger arranged on an optical path of a light beam output from a light source unit, the method includes: detecting whether the exit pupil enlarger is present on the optical path; when the presence of the exit pupil enlarger is successfully detected, driving the light source unit based on input image data to output a light beam, reflecting the light beam from the light source unit so as to raster scan the light beam by driving a scanning mirror unit in a main scanning direction and a sub-scanning direction, and displaying an image based on the input image data; and when the presence of the exit pupil enlarger fails to be detected, reducing intensity of the light beam from the light source unit compared with a case when the presence of the exit pupil enlarger is successfully detected, or outputting no light beam from the light source unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
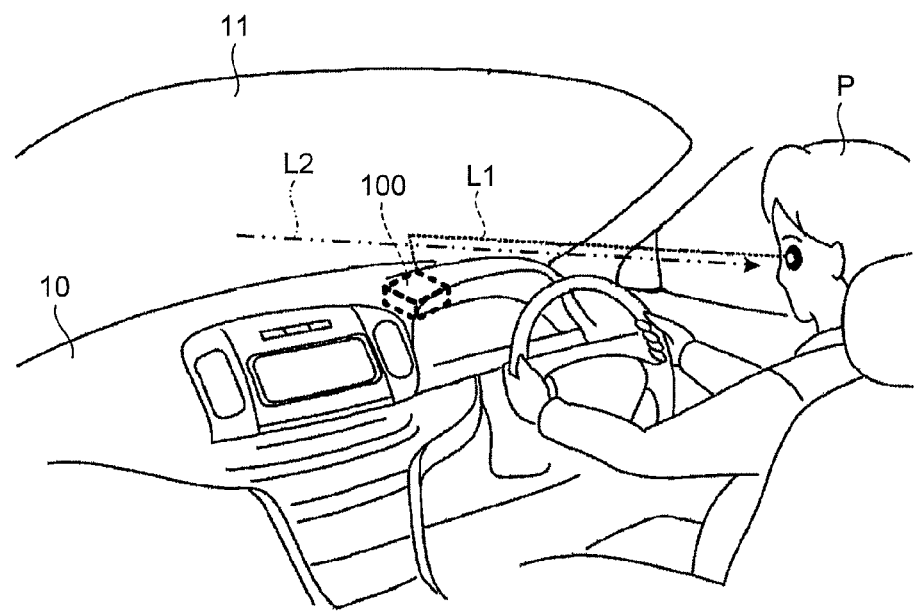
FIG. 1 is a diagram illustrating a typical usage example of an image display apparatus.

Embodiments of the present invention are illustrated and are described with reference to reference numerals assigned to components in the accompanying drawings.

First Embodiment

Described is a first embodiment of an image display apparatus of the present invention.

FIG. 1 illustrates a typical usage example of an image display apparatus 100 assumed by the present invention.

The image display apparatus 100 reflects laser light by a scanning mirror and displays (draws) an image on a projection plane by the raster scanning of a light beam. In FIG. 1, the image display apparatus 100 is mounted on an automobile 10 as an example. An image light beam L1 that is adjusted to display a desired image is emitted (output) from the image display apparatus 100. This image light beam L1 enters the eyes of a driver P through reflection by a windshield 11 and produces an image on the retina. At the same time, external light L2 also enters and passes through the windshield 11. This causes the external light L2 and the image light beam L1 from the light-emitting unit to be overlaid and allows the driver P to view the external actual scene and the image emitted by the image display apparatus 100 simultaneously in the driver's field of view.

Figure 2:
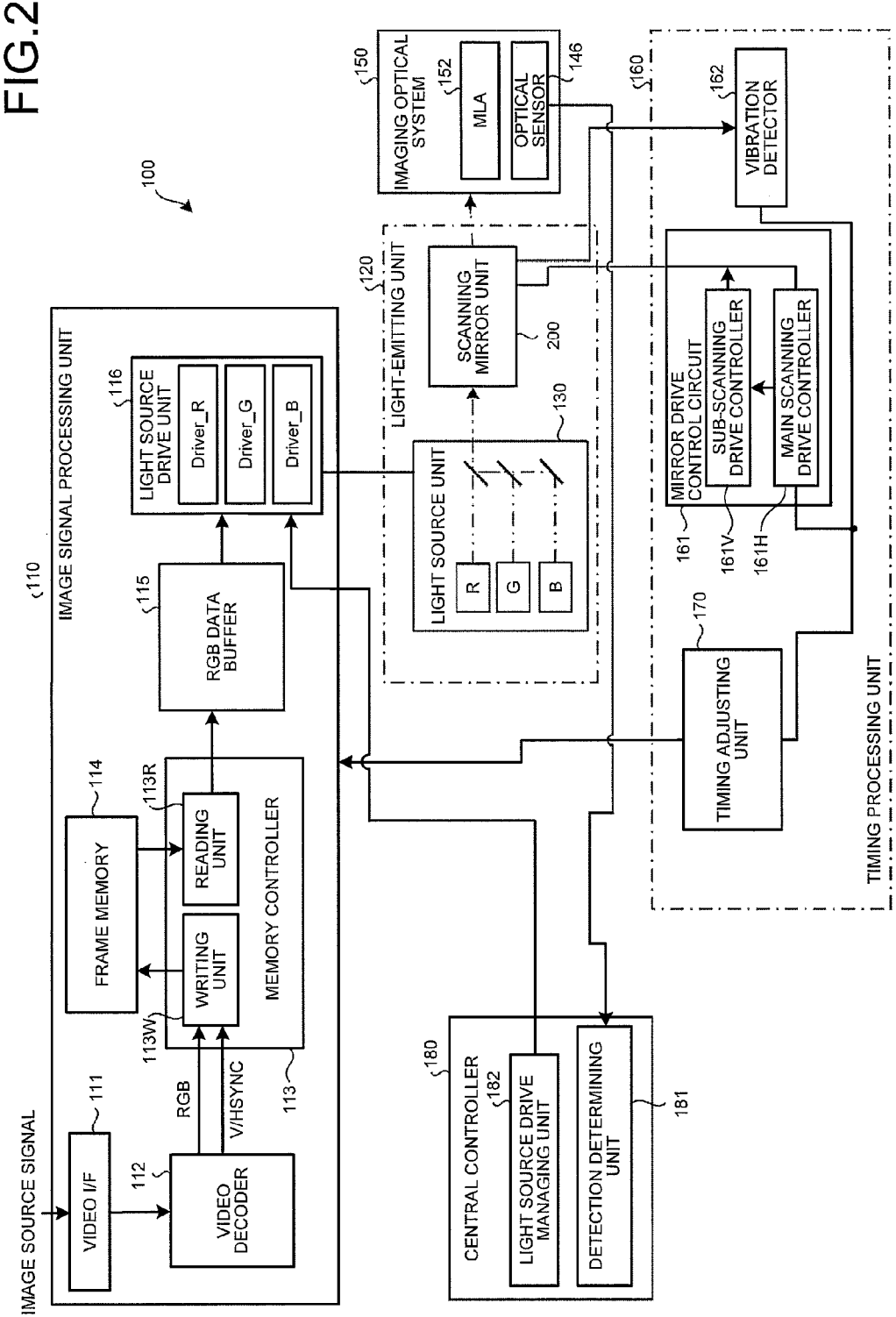
FIG. 2 is a functional block diagram illustrating the entire constitution of an image display apparatus according to a first embodiment.

FIG. 2 is a functional block diagram illustrating the entire constitution of the image display apparatus 100 according to the first embodiment.

The image display apparatus 100 includes an image signal processing unit 110, a light-emitting unit 120, an imaging optical system 150, a timing processing unit 160, and a central controller 180.

The following describes the configuration and operation of the functional units.

The image signal processing unit 110 includes a video interface 111, a video decoder 112, a memory controller 113, a frame memory 114, an RGB data buffer 115, and a light source drive unit 116.

An image source signal is input through the video interface 111. The video decoder 112 performs decode processing on the image source signal in accordance with image type. When the image source signal is an analog image signal (component video signal), for example, the image source signal is separated into a digital image signal including three-color (RGB) digital color signals and a synchronization signal including a horizontal synchronization signal and a vertical synchronization signal by decode processing.

The memory controller 113 includes a writing unit 113W and a reading unit 113R.

Figure 3:
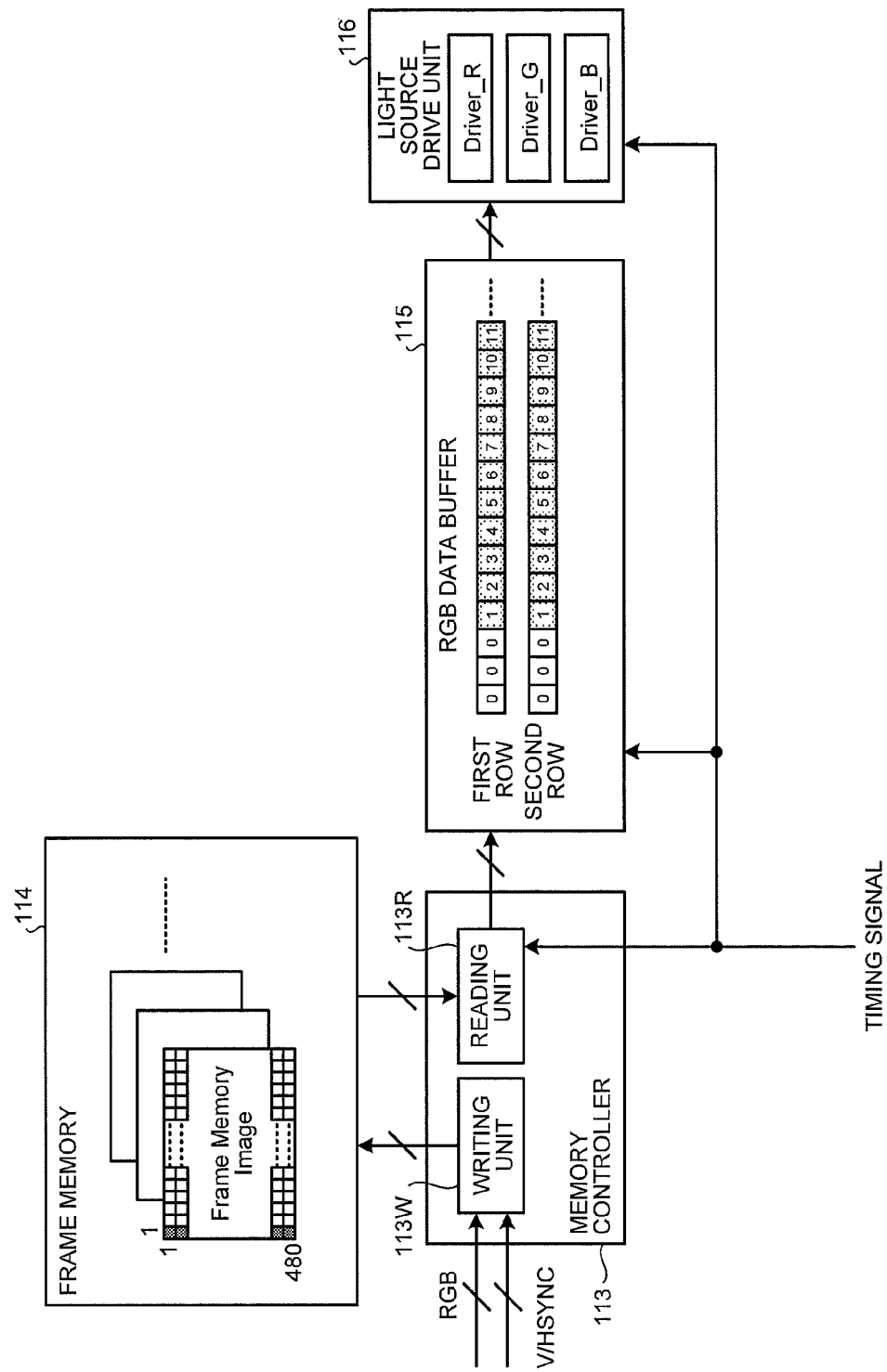
FIG. 3 is a diagram illustrating a flow of processing on a video signal.

FIG. 3 is a diagram illustrating a flow of processing on a video signal.

The writing unit 113W once writes a video signal processed by the video decoder 112 into the frame memory 114 to be buffered. The reading unit 113R reads image data out of the frame memory 114 by one line of main scanning lines based on a designated dot clock. In this situation, the reading unit 113R reads the image data with timing suitable for the laser scanning projection display and outputs the image data to the subsequent stage. In other words, the reading unit 113R reads the image data in accordance with a timing signal (dot clock or display period instruction signal) adjusted by the timing processing unit 160. The thus read image data is temporarily stored in the RGB data buffer 115.

The RGB data buffer 115 temporarily stores therein the image data read by one line. The image data is then successively output to the light source drive unit 116.

The light source drive unit 116 includes a D/A converter and applies a drive current to semiconductor laser diodes as light sources of the light-emitting unit 120 in accordance with the image data and causes the semiconductor laser diodes to emit light with desired brightness. The light sources of the light-emitting unit 120 include a red laser diode, a blue laser diode, and a green laser diode in order to obtain the RGB three colors (refer to FIG. 5 for the specific structure). In accordance therewith, the light source drive unit 116 includes a red driver 116R, a green driver 116G, and a blue driver 116B.

Figure 4:
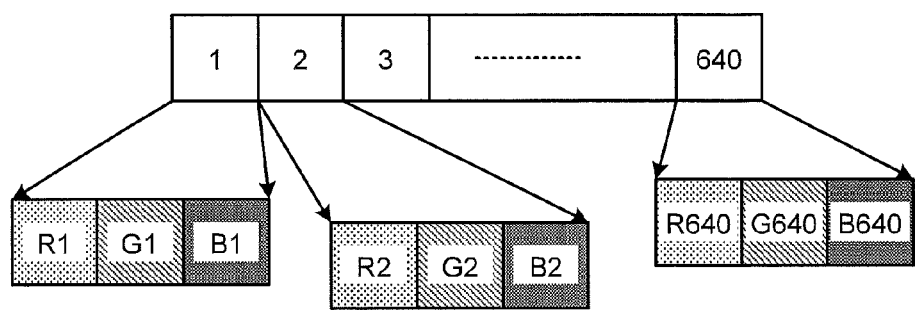
FIG. 4 is a diagram for illustrating the structure of image data.

As might be expected, as illustrated in FIG. 4, each pixel data constituting the image data includes color information consisting of R (red), and G (green), B (blue), for each pixel.

The drivers 116R, 116G, and 116B apply currents to the respective semiconductor laser diodes in accordance with pieces of information on the respective colors of the respective pixels, thereby causing the respective semiconductor laser diodes to emit light with brightness depending on the color information.

The light-emitting unit 120 includes a light source unit 130 and a scanning mirror unit 200.

Figure 5:
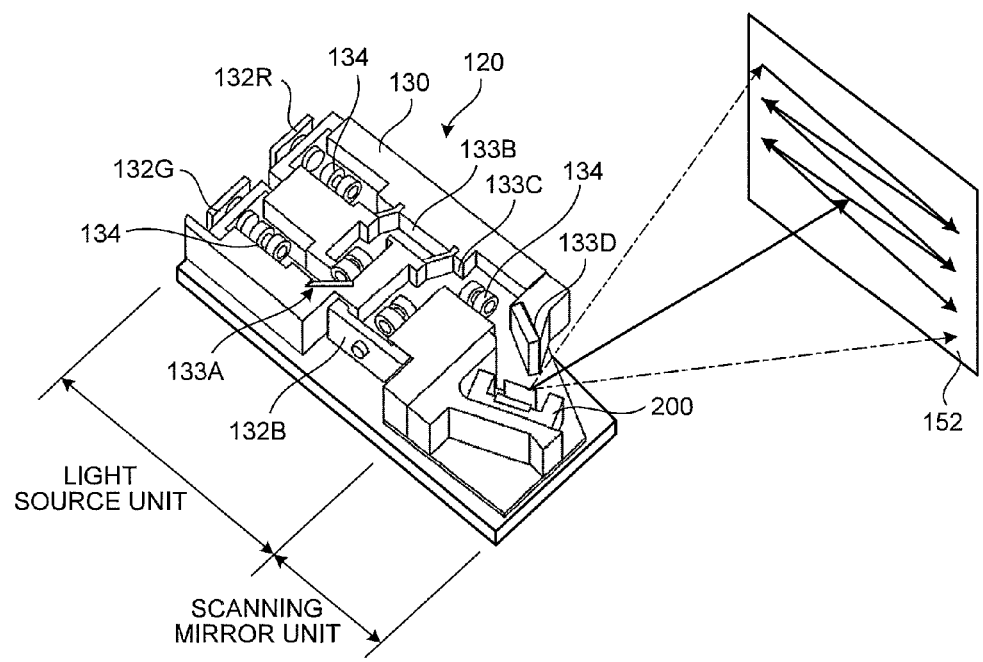
FIG. 5 is a perspective view of a light-emitting unit according to the first embodiment.

FIG. 5 is a perspective view of the light-emitting unit 120, in which the light source unit 130 and the scanning mirror unit 200 are unitized as an example. The light source unit 130 includes three-color laser diodes 132R, 132G, and 132B, a plurality of mirrors 133A, 133B, 133C, and 133D, and a plurality of condenser lenses 134. The laser diodes include the red laser diode 132R, the green laser diode 132G, and the blue laser diode 132B that output R (red), G (green), and B (blue) lasers (laser light), respectively.

The present embodiment can be applied to a configuration using four or more colors of laser diodes or can be applied to a configuration using one or two colors of laser diodes.

The mirrors 133B and 133C are dichroic mirrors that pass or reflect colors of respective predetermined wavelengths. The optical path of light output by the light source unit 130 is briefly described as follows: the first mirror 133A reflects a green laser output by the green laser diode 132G at a right angle and guides the reflected light to the optical path of a red laser.

The second mirror 133B passes the red laser output by the red laser diode 132R and reflects the green laser to combine both. The third mirror 133C passes the light from the second mirror 133B and reflects a blue laser output by the blue laser diode 132B. This gives a light beam obtained by combining the three pieces of laser light on one axis, and finally, the fourth mirror 133D causes the light beam to enter the scanning mirror unit 200 at a predetermined angle. The condenser lenses 134 are arranged on the optical path to condense the laser light. The optical characteristics and arrangement positions of the condenser lenses are determined in relation to the imaging optical system 150 on the following stage.

In FIG. 5, a circuit board is arranged on the back of the light-emitting unit 120. The image signal processing unit 110, the timing processing unit 160, and the central controller 180 are incorporated into the circuit board, which are modularized as a whole, for example.

The following describes the configuration of the scanning mirror unit 200.

The scanning mirror unit 200 is what is called a micro electro mechanical systems (MEMS) device and is manufactured by applying processing technologies for semiconductor integrated circuits. The scanning mirror unit 200 has two oscillation axes that are orthogonal to each other to be capable of being biaxially driven and has a mirror on its one side.

By causing the mirror to oscillate, an image light beam as the light beam obtained by combining the three pieces of laser light output from the light source unit 130 is reflected so as to be raster scanned.

Figure 6:
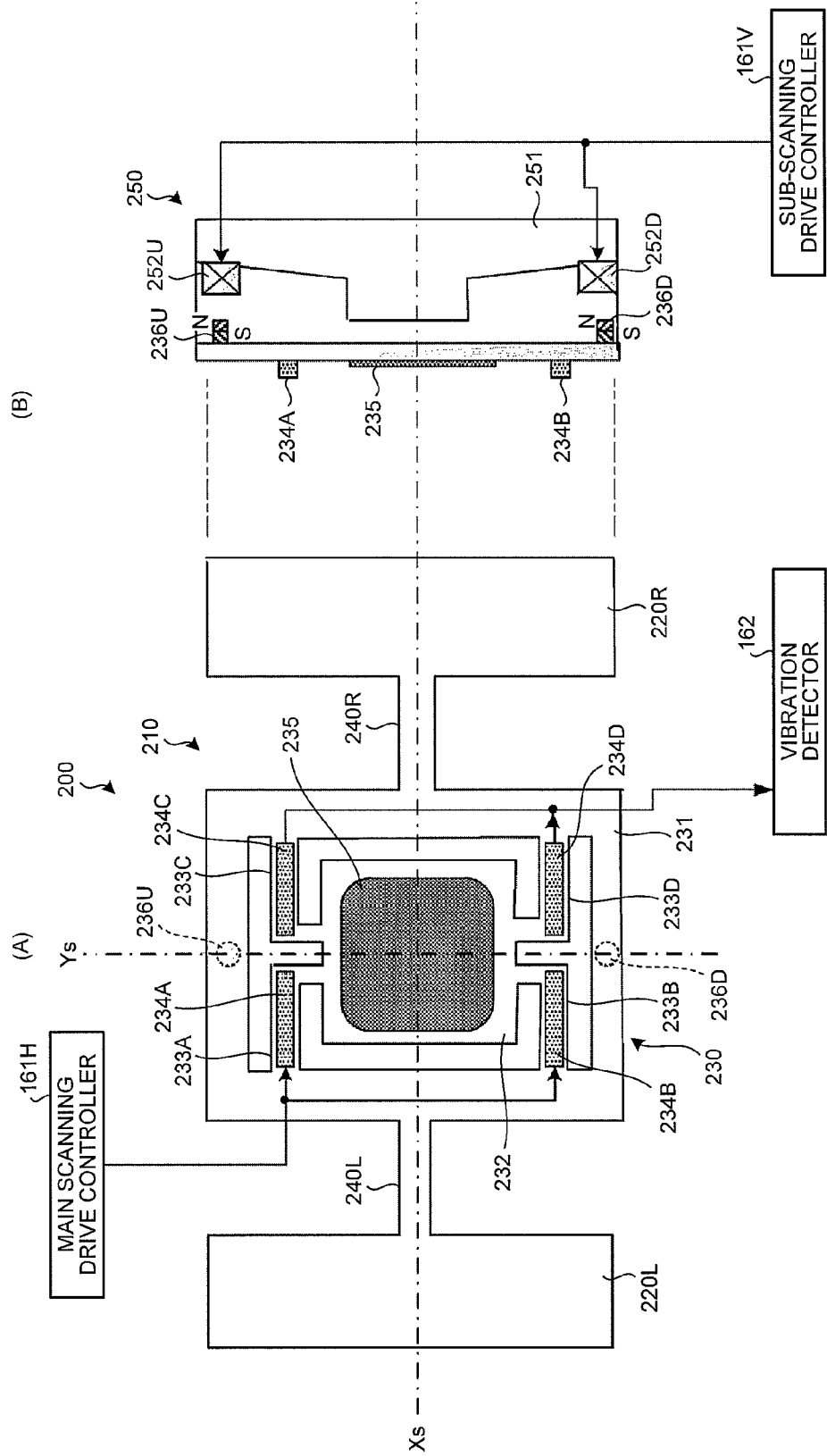
FIG. 6 is a diagram illustrating the structure of a scanning mirror.

The typical structure of the scanning mirror unit 200 is described with reference to FIG. 6.

FIG. 6(A) is a plan view of the scanning mirror unit 200, whereas FIG. 6(B) is schematic sectional view.

The schematic sectional view omits hatching so long as there is no misunderstanding for easy reference.

For the convenience of description, the up-and-down direction of FIG. 6(A) is defined as the direction of an y axis, whereas the lateral direction is defined as the direction of a x axis.

The scanning mirror unit 200 includes an optical deflecting element 210 that is biaxially driven so as to deflect light in the main scanning direction and the sub-scanning direction and a support base unit 250 that supports the optical deflecting element 210.

The optical deflecting element 210 is fabricated from a silicon (Si) wafer by a known semiconductor process.

The optical deflecting element 210 includes two supports 220L and 220R arranged on both sides in the direction of the x axis in FIG. 6A, a sub-scanning oscillator 230 that oscillates in the sub-scanning direction as a whole between the two supports 220L and 220R, and two arms 240L and 240R that connect the two supports 220L and 220R and the sub-scanning oscillator 230.

The two arms 240L and 240R connect the supports 220L and 220R and the sub-scanning oscillator 230 at nearly the center in the up-and-down direction, thereby enabling the sub-scanning oscillator 230 to oscillate with a sub-scanning oscillation axis Xs as the oscillation axis.

The sub-scanning oscillator 230 includes a frame body 231 constituting a frame, a main scanning oscillating piece 232 that is supported spaced apart from the frame body 231 within the frame body 231, four L-shaped beams 233A, 233B, 233C, and 233D that connect an inner edge of the frame body 231 and the main scanning oscillating piece 232, four piezoelectric elements 234A, 234B, 234C, and 234D, a mirror 235, and two magnets 236U and 236D.

The L-shaped beams 233A, 233B, 233C, and 233D connect the inner sides of the frame body 231 parallel to the y axis and the sides of the main scanning oscillating piece 232 parallel to the x axis.

The L-shaped beams 233A, 233B, 233C, and 233D are connected to the main scanning oscillating piece 232 at positions close to the lateral center of the main scanning oscillating piece 232.

This enables the main scanning oscillating piece 232 to oscillate with a main scanning oscillation axis Ys as the oscillation axis.

The piezoelectric elements 234A, 234B, 234C, and 234D are arranged on the parts parallel to the x axis of the four L-shaped beams 233A, 233B, 233C, and 233D.

Although not illustrated in detail, the piezoelectric elements 234A, 234B, 234C, and 234D have a layered structure in which a piezoelectric film is interposed between a lower electrode and an upper electrode.

The mirror 235 is formed on one side of the main scanning oscillating piece 232. The mirror 235 is formed by the vapor deposition of metals having high reflectivity (such as Al and Au).

As is clear from the foregoing structure, the mirror 235 can oscillate in the sub-scanning direction through the support by the arm 240L and the arm 240R and also can oscillate in the main scanning direction through the support by the L-shaped beams 233A, 233B, 233C, and 233D.

The two magnets 236U and 236D are arranged on the upper and lower parts along the y axis of the main scanning oscillating piece 232.

With the side on which the mirror 235 is formed as the front side, the magnets 236U and 236D are affixed onto the back side of the sub-scanning oscillator 230.

The support base unit 250 includes a base 251 and two magnetic coils 252U and 252D. The magnetic coils 252U and 252D are arranged so as to pair with the magnets 236U and 236D, respectively.

Finally, electric wiring is described.

Among the four piezoelectric elements 234A, 234B, 234C, and 234D being arranged, the two piezoelectric elements 234A and 234B induce vibrations in the main scanning oscillating piece 232, whereas the two piezoelectric elements 234C and 234D detect the vibrations of the main scanning oscillating piece 232. Specifically, in FIG. 6A, drive signals are applied to the two driving piezoelectric elements 234A and 234B that are arranged on the left with respect to the main scanning oscillation axis Ys. The vibrations of the two driving piezoelectric elements 234A and 234B on the left side are then transmitted to the main scanning oscillating piece 232 through the L-shaped beams 233A and 233B, thereby causing the main scanning oscillating piece 232 to oscillate with the main scanning oscillation axis Ys as the oscillation axis. The two detecting piezoelectric elements 234C and 234D arranged on the right side with respect to the main scanning oscillation axis Ys detect the vibrations of the main scanning oscillating piece 232. A drive voltage signal having a given phase difference with respect to a vibration detection signal obtained from the detecting piezoelectric elements 234C and 234D is fed back to the driving piezoelectric elements 234A and 234B, thereby enabling to resonantly drive the main scanning oscillating piece 232.

A drive current that causes the sub-scanning oscillator 230 to oscillate at a given cycle is applied to the magnetic coils 252U and 252D. This causes the magnetic coils 252U and 252D and the magnets 236U and 236D to repeat repulsion and attraction alternately and causes the sub-scanning oscillator 230 to oscillate with the sub-scanning oscillation axis Xs as the oscillation axis. The oscillation in the sub-scanning direction is non-resonant drive and is adjusted in accordance with the cycle of the vertical drive of image data.

The following describes the imaging optical system 150.

Figure 7:
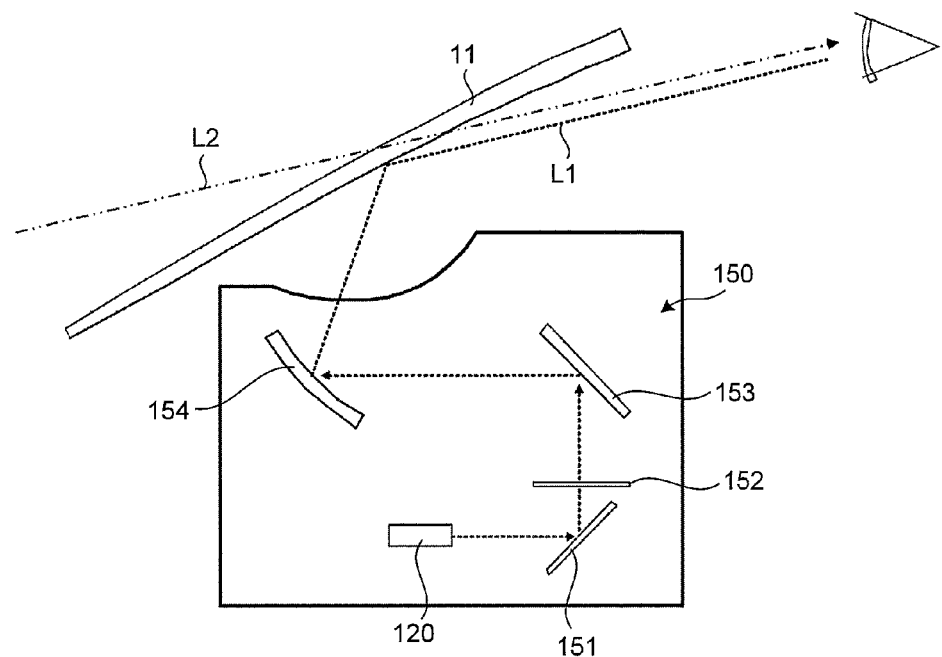
FIG. 7 is a diagram illustrating an optical path until an image light beam L1 emitted from the light-emitting unit reaches an eye of a viewer.

FIG. 7 is a diagram schematically illustrating an optical path until an image light beam L1 emitted from the light-emitting unit 120 reaches the eyes of a viewer.

The configuration of the imaging optical system 150 is only required to guide the image light beam L1 emitted from the light-emitting unit 120 to the eyes of the viewer and is not limited to any specific configuration.

The position at which a microlens array (MLA) 152 as an exit pupil enlarger described below is only required to be on the optical path of the light beam output from the light source unit 130.

In other words, the position is only required to be on the optical path between an eye of a user viewing an image based on the image light beam L1 and the light source unit 130.

The imaging optical system 150 includes a flat mirror 151, the microlens array 152, a flat mirror 153, and a concave mirror 154.

FIG. 7 also illustrates the windshield 11 as a combiner.

The microlens array 152 is of the light transmission type and arranges microlenses in a matrix form or a honeycomb form. The microlens array 152 has the effect of reducing laser-specific speckles and is optimally designed considering radiation angles and color irregularities. By diffusing (radiating) laser light by this microlens array 152, laser intensity per unit area reduces. This reduces a burden on the eye, and it is safe even when the light beam enters the eye.

The light beam L1 reflected by the scanning mirror unit 200 once forms an intermediate image on the microlens array 152. The light beam L1 then reaches the eyes of the viewer through the reflections by the flat mirror 153, the concave mirror 154, and the windshield 11. The image light beam L1 and the external actual scene are overlaid on the windshield 11 as the combiner.

Figure 8:
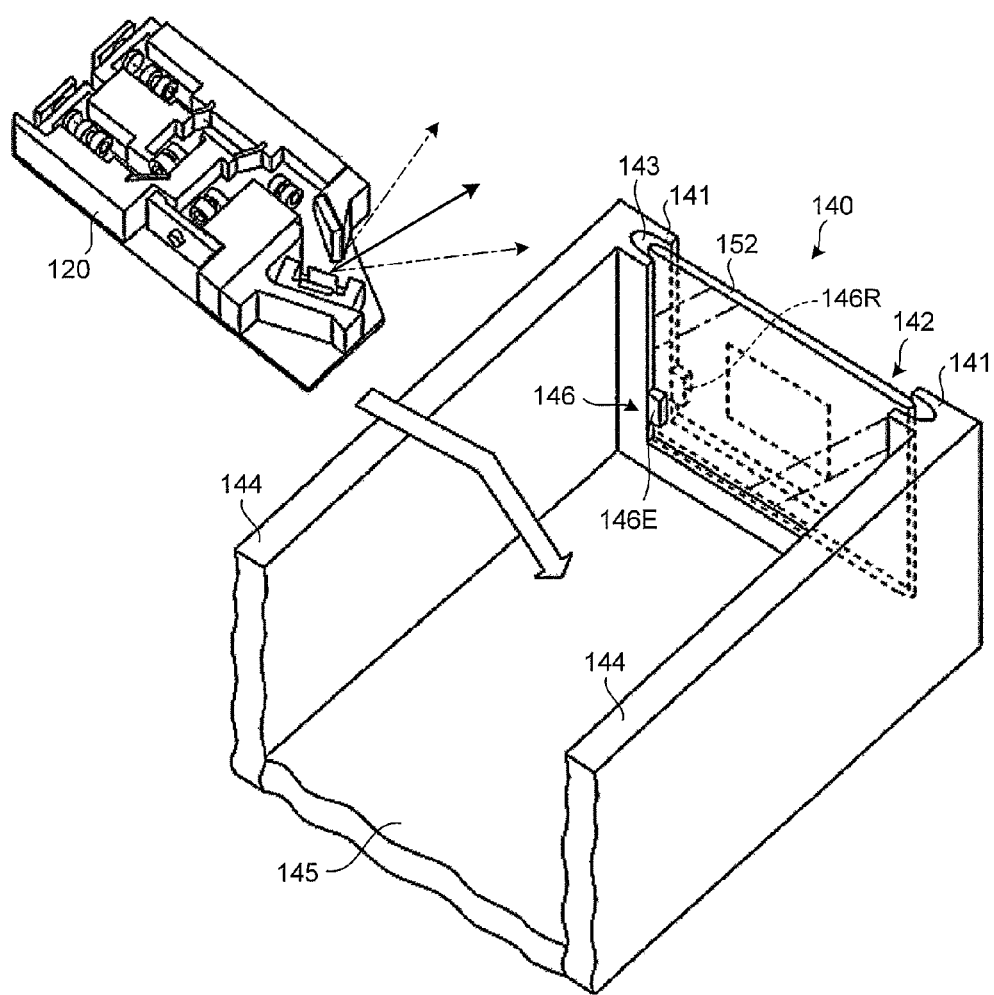
FIG. 8 is a diagram illustrating an installation mode of a microlens array according to the first embodiment.

FIG. 8 is a diagram illustrating an installation mode of the microlens array 152.

Because the arrangement shape of the microlenses in the microlens array 152 can be similar to the arrangement shape in general microlens arrays, its illustration is omitted.

As illustrated in FIG. 8, the microlens array 152 is supported by a frame structure 140, thereby causing its position and attitude to be fixed.

The frame structure 140 includes a front frame 141 having a window 142, two side walls 144 and 144, and a bottom face 145. Space defined by the two side walls 144 and 144 and the bottom face 145 may store therein the whole or part of the light-emitting unit 120 to be modularized.

The front frame 141 includes the window 142 into which the microlens array 152 can be fitted. Although the window 142 is U-shaped with one side of a rectangular removed in FIG. 8, it is understood that the window 142 may be circular or rectangular in shape. Although a groove 143 is formed on the three inner end faces constituting the window 142 and the microlens array 152 is fitted into the groove 143 in FIG. 8, the method for fixing the microlens array 152 is not limited to this.

A detector that detects the presence of the microlens array 152 (whether being arranged on the optical path of the light beam output from the light source unit 130) is arranged on the front frame 141. The detector is an optical sensor 146 in this example.

Figure 9:
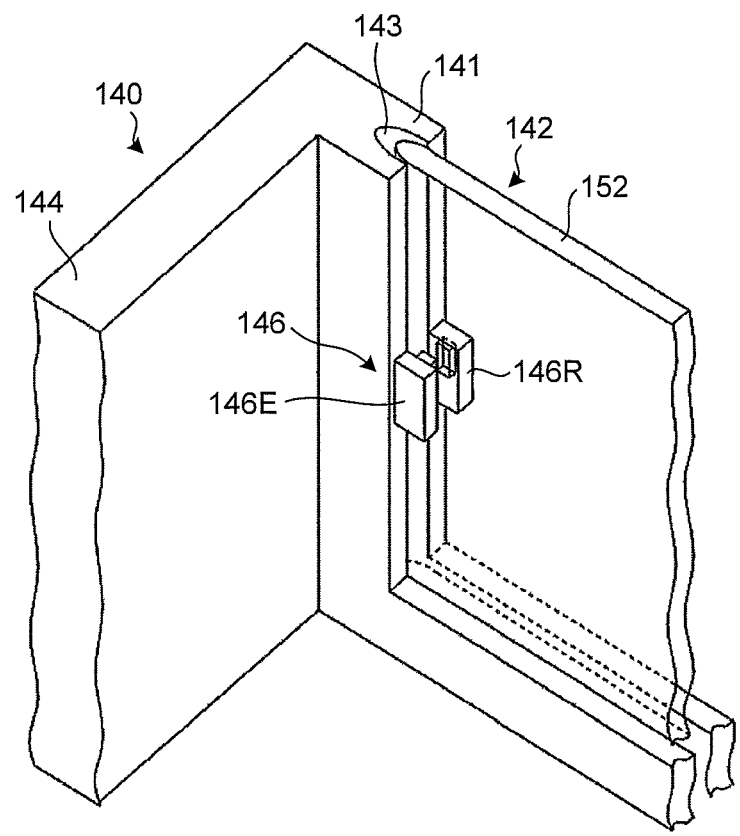
FIG. 9 is a diagram illustrating an installation mode of an optical sensor.

As illustrated in FIG. 9, the optical sensor 146 includes a light-emitting unit 146E and a light-receiving unit 146R; the light-emitting unit 146E and the light-receiving unit 146R are arranged on opposite sides across the microlens array 152. When the light-emitting unit 146E emits light, the light reaches the light-receiving unit 146R through the microlens array 152. The light is diffused if the microlens array 152 is present, whereby the intensity of the light received by the light-receiving unit 146R is reduced. It can be thus determined that the microlens array 152 is present if the intensity of the received light is at a given value or lower.

Figure 10:
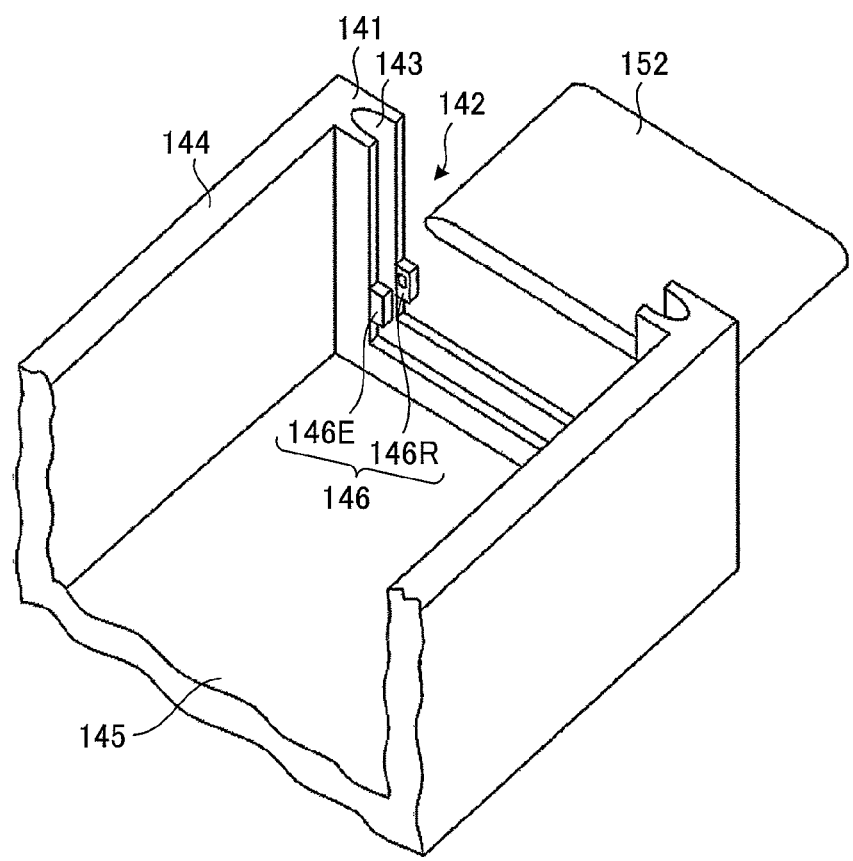
FIG. 10 is a diagram illustrating a state in which a microlens array 152 has dropped off.

FIG. 10 illustrates a state in which the microlens array 152 has dropped off.

When the microlens array 152 drops off as illustrated in FIG. 10, the light from the light-emitting unit 146E directly enters the light-receiving unit 146R. Therefore, if the intensity of the received light exceeds the given value, it can be determined that the microlens array 152 is absent.

A signal photoelectrically converted by the light-receiving unit 146R is output to the central controller 180.

The following describes the timing processing unit 160.

The timing processing unit 160 includes a mirror drive control circuit 161, a vibration detector 162, and a timing adjusting unit 170.

Matters that require timing processing include main scanning drive control for the scanning mirror unit 200, sub-scanning drive control for the scanning mirror unit 200, and the generation of a timing signal for synchronizing image processing timing in the image signal processing unit 110 with the drive of the scanning mirror unit 200.

The mirror drive control circuit 161 includes a main scanning drive controller 161H that performs the main scanning drive control for the scanning mirror unit 200 and a sub-scanning drive controller 161V that performs the sub-scanning drive control for the scanning mirror unit 200.

With regard to the main scanning drive control for the scanning mirror unit 200, the vibration detector 162 detects a detection signal from the detecting piezoelectric elements 234C and 234D of the scanning mirror unit 200. The vibration detector 162 can include an amplifier circuit and a filter, for example. A detected vibration detection signal Sn is fed back to the main scanning drive controller 161H, is subjected to phase adjustment so that the scanning mirror unit 200 resonates in the main scanning direction, and is applied to the driving piezoelectric elements 234A and 234B as a main scanning drive control signal SH. This resonantly drives the scanning mirror unit 200 in the main scanning direction.

The sub-scanning drive controller 161V non-resonantly drives the scanning mirror unit 200 in the sub-scanning direction in accordance with the cycle of the vertical drive of the image data. The vibration frequency in the sub-scanning direction is 60 Hz for VGA, for example. The sub-scanning drive controller 161V outputs a sub-scanning drive signal SV that causes the scanning mirror unit 200 to oscillate at 60 Hz in the sub-scanning direction in sync with the main scanning drive control signal SH output from the main scanning drive controller 161H.

The timing adjusting unit 170 performs timing processing so as to conform the operation of the memory controller 113 with the drive of the scanning mirror unit 200. Specifically, the resonant frequency of the scanning mirror unit 200 in the main scanning direction is multiplied to generate a dot clock. The dot clock is supplied to the reading unit 113R, the RGB data buffer 115, and the light source drive unit 116 as a timing signal.

The following describes operation that performs drawing based on the thus generated timing signal (dot clock or display period instruction signal) in order.

First, the reading unit 113R reads the image data by one line with the timing of the dot clock and outputs the image data to the RGB data buffer 115.

The image data temporarily stored in the RGB data buffer 115 is successively sent to the light source drive unit 116. The semiconductor laser diodes of the respective colors are driven to emit light with brightness instructed by the image data. The brightness and the main-scanning and sub-scanning drive of the respective colors are synchronized, thereby drawing respective pixels appropriately and drawing an image based on desired image data.

The following describes the operation of the central controller 180.

The central controller 180 controls the operation of the entire image display apparatus 100.

In the present embodiment in particular, the central controller 180 monitors the status of the imaging optical system 150 and manages the on/off operation of laser light emission in accordance with the status of the imaging optical system 150.

The central controller 180 includes a detection determining unit 181 and a light source drive managing unit 182.

The detection determining unit 181 determines the presence or absence of the microlens array 152 based on a photoelectric conversion signal output from the optical sensor (detector) 146. Specifically, when comparing the photoelectric conversion signal with a threshold, and if the level of the photoelectric conversion signal is at the threshold or lower, it is determined that the microlens array 152 is present. If the level of the photoelectric conversion signal exceeds the threshold, it is determined that the microlens array 152 is absent.

The light source drive managing unit 182 manages the operation of the light source drive unit 116 based on the determination result by the detection determining unit 181.

If it is determined that the microlens array 152 is present, the light source drive managing unit 182 permits the operation of the light source drive unit 116.

In this case, the image display apparatus 100 performs normal operation, which is operation when it is determined that the microlens array 152 is present.

Specifically, the drive currents are applied from the light source drive unit 116 to the semiconductor laser diodes 132R, 132G, and 132B of the light source unit 130, and the light from the semiconductor laser diodes 132R, 132G, and 132B enter the eyes of the user, thereby enabling the user to view the image.

Thus, in the normal operation, an image based on input image data, for example, is displayed so that the user can view it sufficiently.

If it is determined that the microlens array 152 is absent, the light source drive managing unit 182 does not permit the operation of the light source drive unit 116 and stops the operation of the light source drive unit 116.

It is preferable that when the power is turned on, the central controller 180 first performs the detection determination about the microlens array 152 and then continues to perform the detection determination at all times while the image display apparatus 100 is operated.

A vibration sensor (not illustrated) may be installed, and the detection determination may be performed when a vibration of a certain value or more is detected by the vibration sensor.

Figure 11:
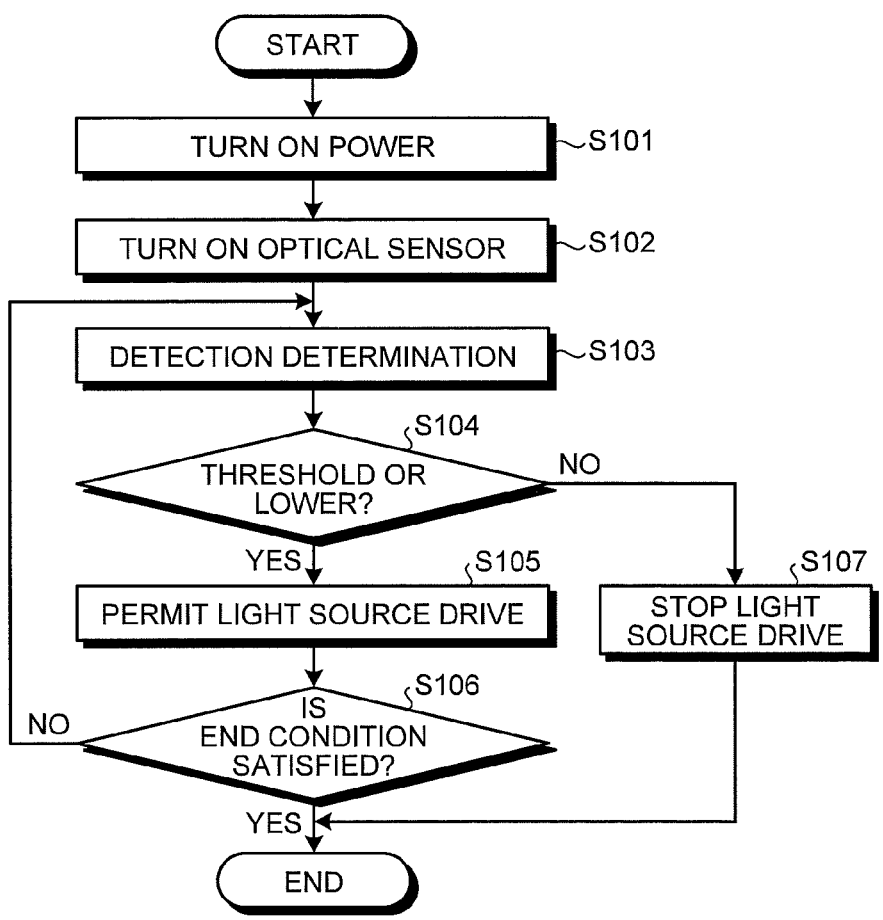
FIG. 11 is a flowchart illustrating a procedure of a control action by a central controller according to the first embodiment.

Managing operation by the central controller 180 is described with reference to the flowchart in FIG. 11.

Triggered by turning on the power of the image display apparatus 100 by the user (Step S101) or the like, first, the optical sensor (detector) 146 is started up (Step S102).

In other words, light is emitted from the light-emitting unit 146E, and the light is received by the light-receiving unit 146R.

The detection determining unit 181 performs the detection determination about the microlens array 152 based on the photoelectric conversion signal output from the light-receiving unit 146R (Step S103).

If the level of the photoelectric conversion signal is at the threshold or lower (Yes at Step S104), it is determined that the microlens array 152 is present, and the light source drive managing unit 182 permits the operation of the light source drive unit 116 (Step S105). This is accordingly the normal operation, which causes the light from the semiconductor laser diodes 132R, 132G, and 132B to enter the eye to form an image.

In other words, the image based on the input image data is displayed. This enables the user to view the image.

The loop from Step S103 to Step S105 is repeated until an end condition (the fact that the user has turned off the power, for example) is satisfied (Step S106).

At Step S104, if the level of the photoelectric conversion signal exceeds the threshold (No at Step S104), it is regarded that the microlens array 152 fails to be detected for any reasons.

In this case, the light source drive managing unit 182 stops the operation of the light source drive unit 116 (Step S107). This stops the light emission of the semiconductor laser diodes 132R, 132G, and 132B.

When the semiconductor laser diodes 132R, 132G, and 132B are not yet operated to emit light, they are not permitted to emit light.

The first embodiment having the above constitution produces the following effect.

The present embodiment detects the presence or absence of the microlens array 152, and when the microlens array 152 is absent, the light source drive is stopped. This causes only the light subjected to the diffusion by the microlens array 152 to enter the eye and prevents the light not subjected to the diffusion from entering the eye. Thus, even in the unlikely event that the microlens array 152 has dropped off due to some mode of use, the laser light does not impose an excessive burden on the eye.

First Modification

Figure 12:
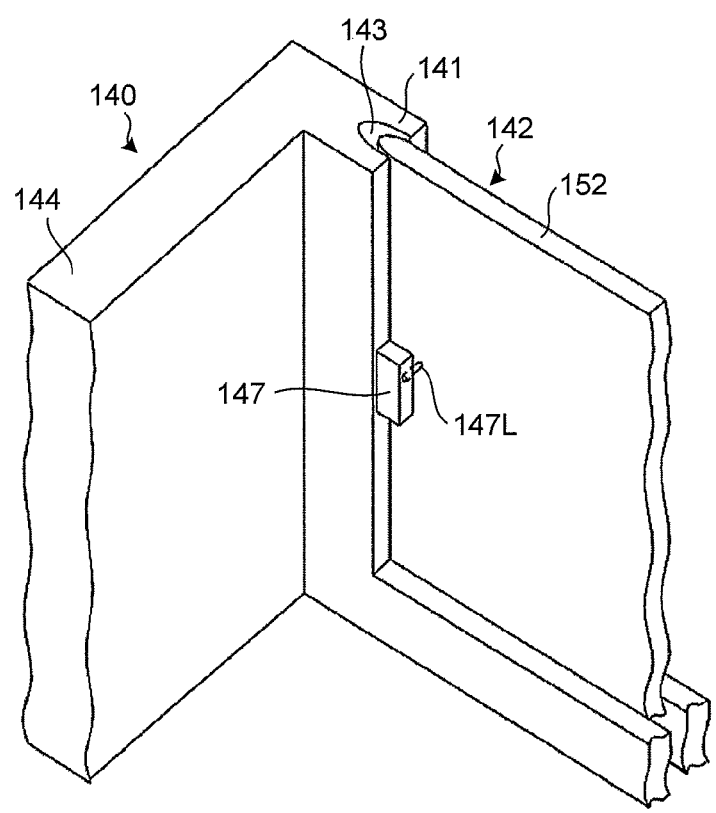
FIG. 12 is a diagram illustrating an example of a mechanical sensor as a first modification.

It is understood that the detector is not limited to the optical sensor 146 and may be a mechanical sensor 147. As illustrated in FIG. 12, for example, a rod 147L may be made contact with the microlens array 152 to detect the presence or absence of the microlens array 152 based on an amount of reciprocating motion of the rod 147L. It might be clear that the detector is, not limited to optical and mechanical ones, only required to be a sensor configured to detect the presence or absence of the microlens array 152 and that its manner of installation is not limited at all.

Second Modification

The above embodiment describes the constitution that manages the operation of the light source drive unit 116 by the central controller 180.

As a second modification, an output signal from the detector 146 may directly control the on/off of the light source drive unit 116 without the involvement of the central controller 180.

Figure 13:
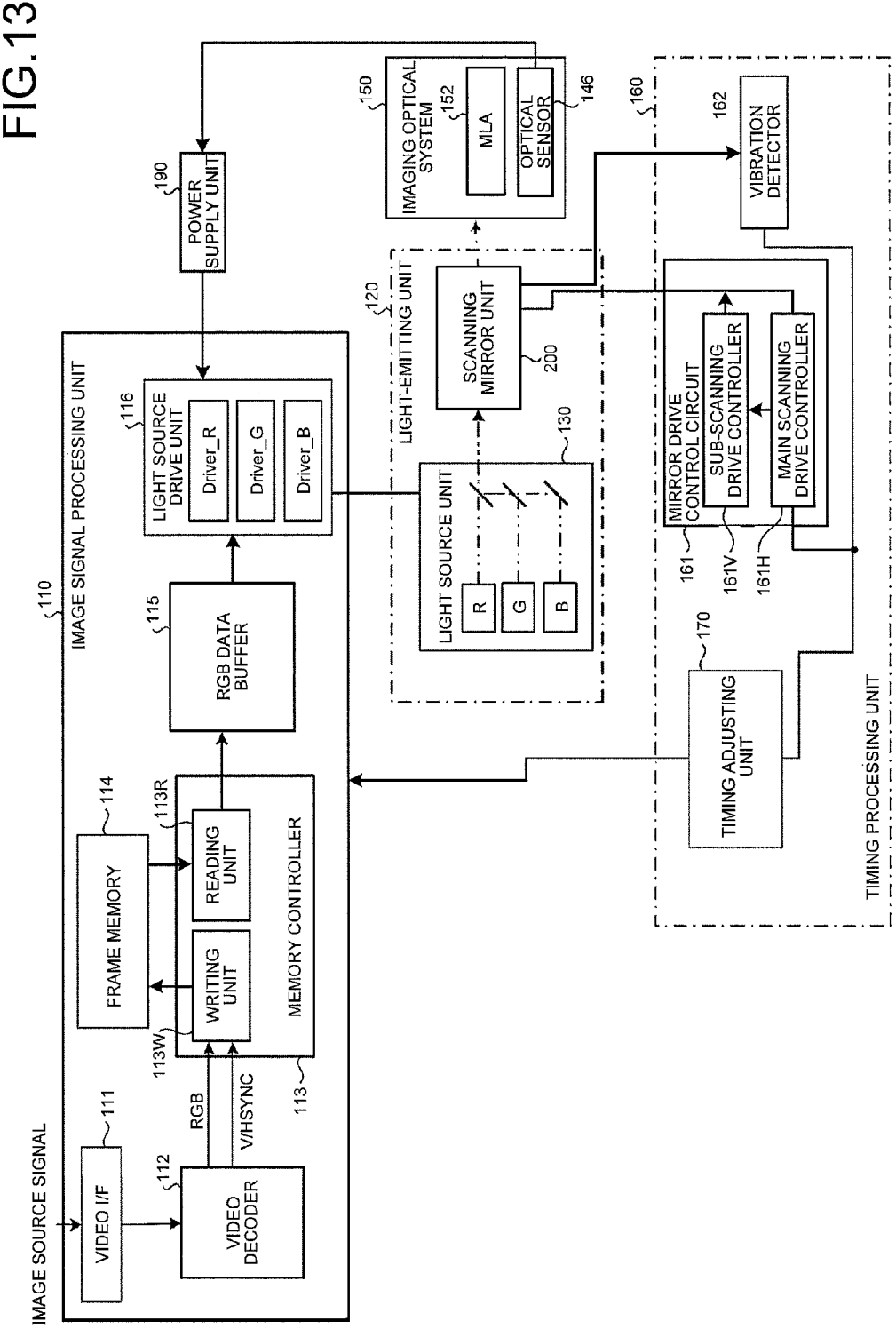
FIG. 13 is a diagram illustrating a second modification.

As illustrated in FIG. 13, for example, the light source drive unit 116 is supposed to acquire an operational current from a power supply unit 190.

The output signal of the optical sensor (detector) 146 is directly input to the power supply unit 190.

When the presence of the microlens array 152 fails to be detected, the power supply from the power supply unit 190 to the light source drive unit 116 is stopped.

In stopping the power supply from the power supply unit 190 to the light source drive unit 116, the power supply unit 190 may be turned off by a power supply controller (not illustrated), and a switch may be used that interrupts electric connection between the power supply unit 190 and the light source drive unit 116.

Third Modification

The above embodiment stops the operation of the light source drive unit 116 when the microlens array 152 is absent. In other words, when the microlens array 152 is absent, the light emission of the semiconductor laser diodes 132R, 132G, and 132B are totally stopped.

When the microlens array 152 is absent, without stopping the pieces of light emission of all the semiconductor laser diodes 132R, 132G, and 132B, the output thereof may be weakened. An applied current value from the light source drive unit 116 to the light source unit 130 may be reduced compared with that of the normal operation, for example, and may be halved, for example. Even when the light enters the eyes of the user, this reduces a burden on the eye.

Further, if the microlens array 152 is absent, the user is aware immediately that any failures occur, as the image is not clearly formed.

Alternatively, when the microlens array 152 is absent, one or more of the red light, the green light, and the blue light may be stopped. When the microlens array 152 is absent, the green light and the blue light are stopped, for example, while only the red light is emitted, thereby causing only red color to be visible to the eyes of the user. This causes only red color to be visible to the eyes of the user, reduces a burden on the eyes and at the same time, immediately conveys to the user that d a failure is occurring.

When the microlens array 152 is absent, one or more of the red light, the green light, and the blue light may be stopped, while weakening the light that is emitted. Only the red semiconductor laser diode 132R is driven, for example, and its drive current is reduced. This further reduces a burden on the eye. When the microlens array 152 is absent, one or more of the red light, the green light, and the blue light may be weakened, while causing them to be emitted with the balance of the light intensity of the red light, the green light, and the blue light different from the balance in the normal state. This causes an image with a color balance different from the color balance in the normal state to be visible to the eyes of the user, reduces a burden on the eyes, and at the same time, conveys to the user that time a failure is occurring.

When the microlens array 152 is absent, a message image indicating a failure (abnormality) may be displayed with light with reduced output, and then all light emissions of the semiconductor laser diodes 132R, 132G, and 132B may be stopped.

Second Embodiment

Described is a second embodiment of an image display apparatus of the present invention. Similar functions to the first embodiment are referred to as the same reference numerals, and the description thereof is omitted below.

Figure 14:
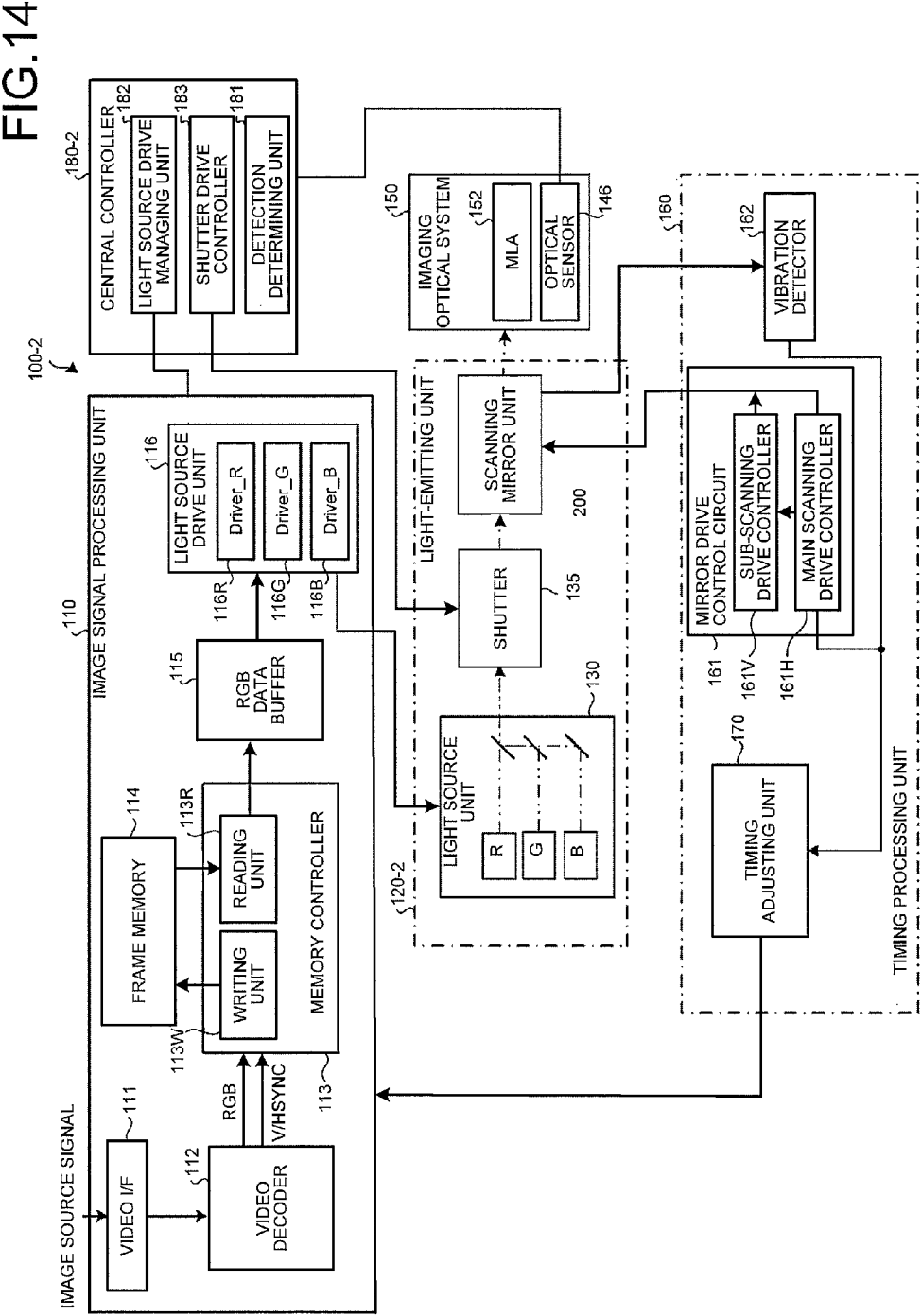
FIG. 14 is a functional block diagram illustrating the entire constitution of an image display apparatus according to a second embodiment.

FIG. 14 is a functional block diagram illustrating the entire constitution of an image display apparatus 100-2.

The image display apparatus 100-2 includes the image signal processing unit 110, a light-emitting unit 120-2, the imaging optical system 150, the timing processing unit 160, and a central controller 180-2.

The following describes the configuration and operation of the functional units.

The light-emitting unit 120-2 according to the second embodiment includes the light source unit 130, the scanning mirror unit 200, and a shutter 135.

Figure 15:
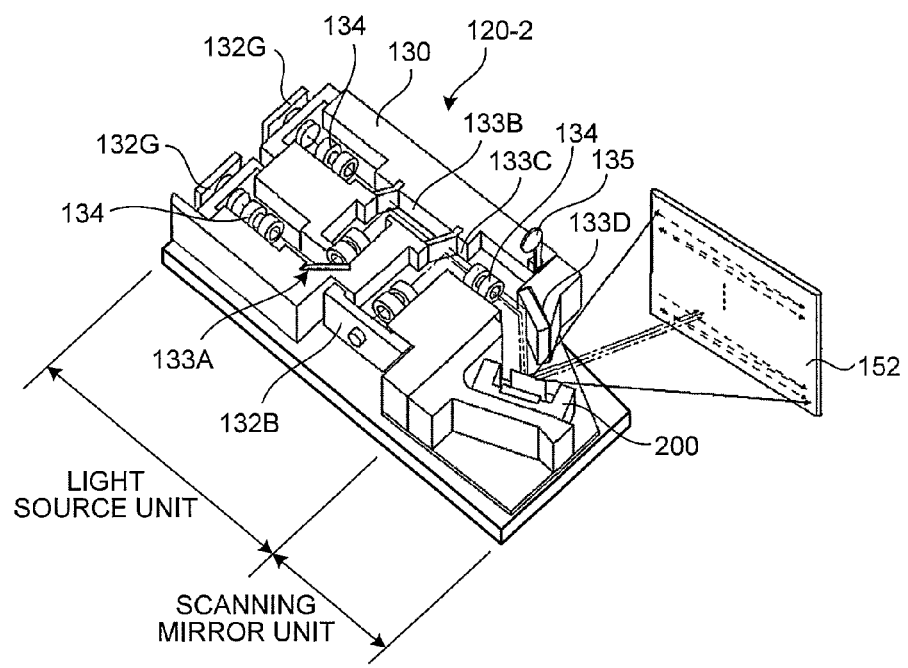
FIG. 15 is a perspective view of a light-emitting unit according to the second embodiment.

FIG. 15 is a perspective view of the light-emitting unit 120-2, in which the light source unit 130 and the scanning mirror unit 200 are unitized as an example.

Figure 16:
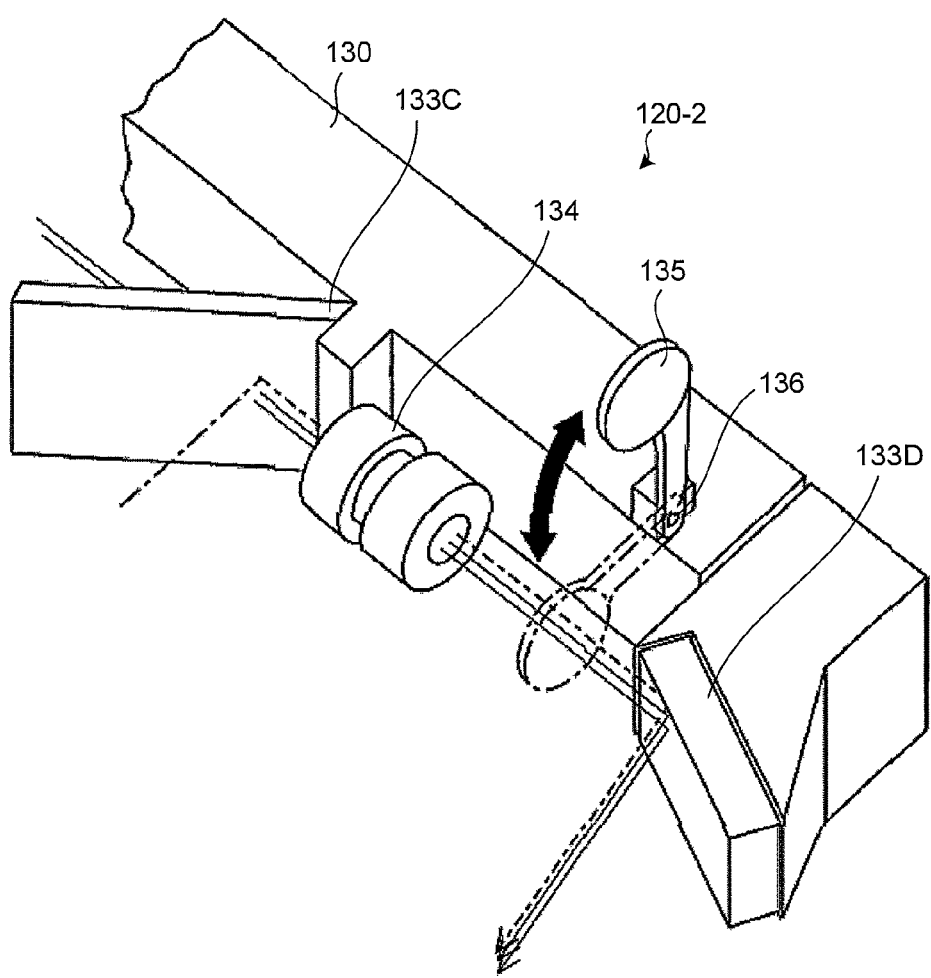
FIG. 16 is an enlarged view of a part near a shutter according to the second embodiment.

The shutter 135 is arranged between the light source unit 130 and the scanning mirror unit 200 in the light-emitting unit 120-2. FIG. 15 illustrates an example in which the shutter 135 oscillatably arranged between the third mirror 133C and the fourth mirror 133D is arranged so that it can enter and leave the optical path. FIG. 16 is an enlarged view of a part near the shutter 135.

The shutter 135 is oscillatable about an axis 136 and is oscillatably driven by a motor (not illustrated) that engages with the axis 136.

The shutter 135 is formed of a member that blocks light.

In a state in which the shutter is not present in the optical path, the laser light is emitted from the light source unit 130 without being blocked, whereas in a state in which the shutter is present in the optical path, the laser light is blocked, and no light is emitted from the light source unit 130. Even if the drive currents are applied to the laser diodes 132R, 132G, and 132B, and light is being emitted from the laser diodes 132R, 132G, and 132B, the light does not reach the retina when the shutter is closed.

In the present specification, the state in which the shutter 135 is present in the optical path to block the laser light may be represented as "the shutter 135 is closed."

The state in which the shutter 135 is not present in the optical path may be represented as "the shutter 135 is open."

The drive timing of the shutter is described below.

Figure 17:
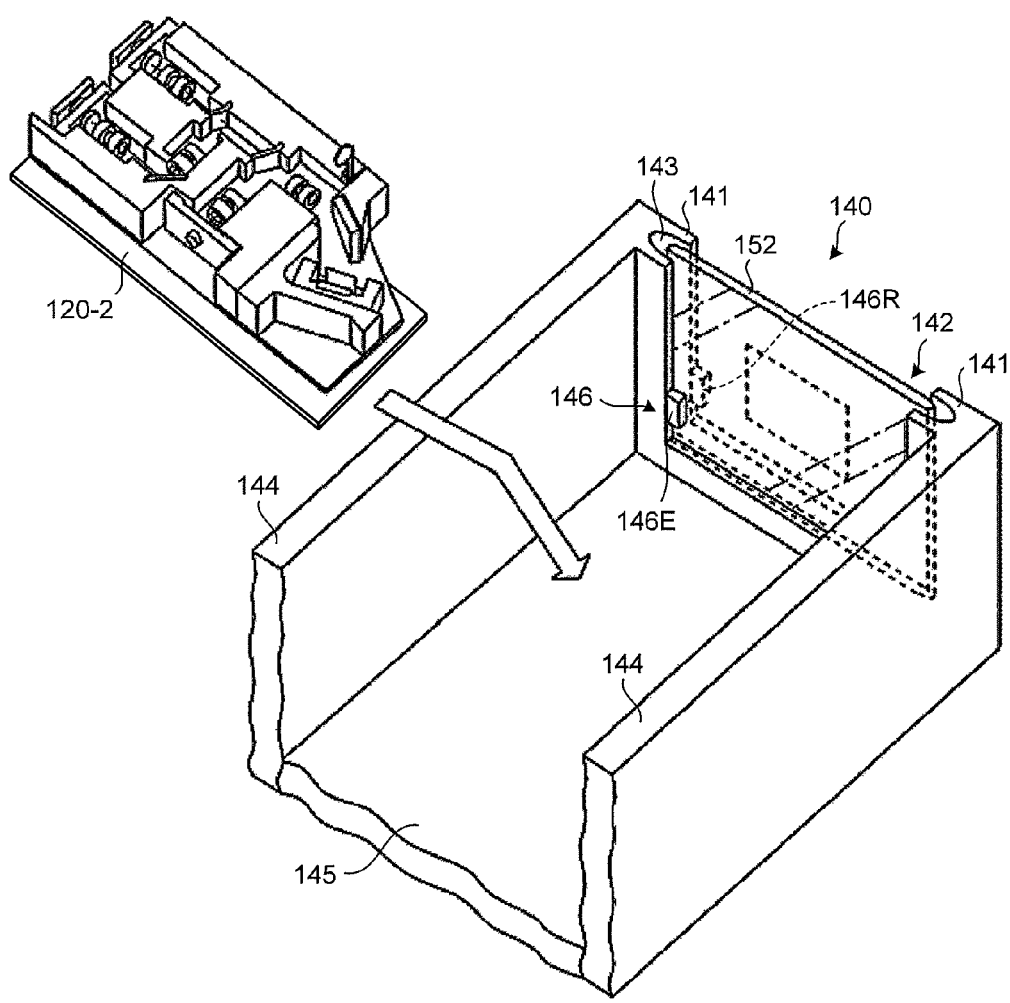
FIG. 17 is a diagram illustrating an installation mode of a microlens array according to the second embodiment.

FIG. 17 is a diagram illustrating an installation mode of the microlens array 152. The drawing is the same as FIG. 8 except that the light-emitting unit 120 is replaced with the light-emitting unit 120-2, and the description thereof is omitted.

The following describes the operation of the central controller 180-2.

The central controller 180-2 controls the operation of the entire image display apparatus 100-2 of the second embodiment.

In the present embodiment in particular, the central controller 180-2 monitors the status of the imaging optical system 150 and manages the opening/closing operation of the shutter 135 and the on/off operation of laser light emission in accordance with the status of the imaging optical system 150.

The central controller 180-2 includes the detection determining unit 181, a shutter drive controller 183, and the light source drive managing unit 182.

The shutter drive controller 183 controls the opening/closing operation of the shutter 135 based on the determination result by the detection determining unit 181.

If it is determined that the microlens array 152 is present, the shutter drive controller 183 causes the shutter 135 to be an open state. In this state, when laser light is emitted from the semiconductor laser diodes 132R, 132G, and 132B, the normal operation is performed, which is operation when it is determined that the microlens array 152 is present. Specifically, with the shutter 135 open, an image based on input image data, for example, is displayed so that the user can view it sufficiently.

If it is determined that the microlens array 152 is absent, the shutter drive controller 183 closes the shutter. In this case, even if light is emitted from the semiconductor laser diodes 132R, 132G, and 132B, the light is blocked by the shutter 135 and does not reach the retina.

In addition to the operation by the shutter drive controller 183, the following operation by the light source drive managing unit 182 may be performed in combination.

Figure 18:
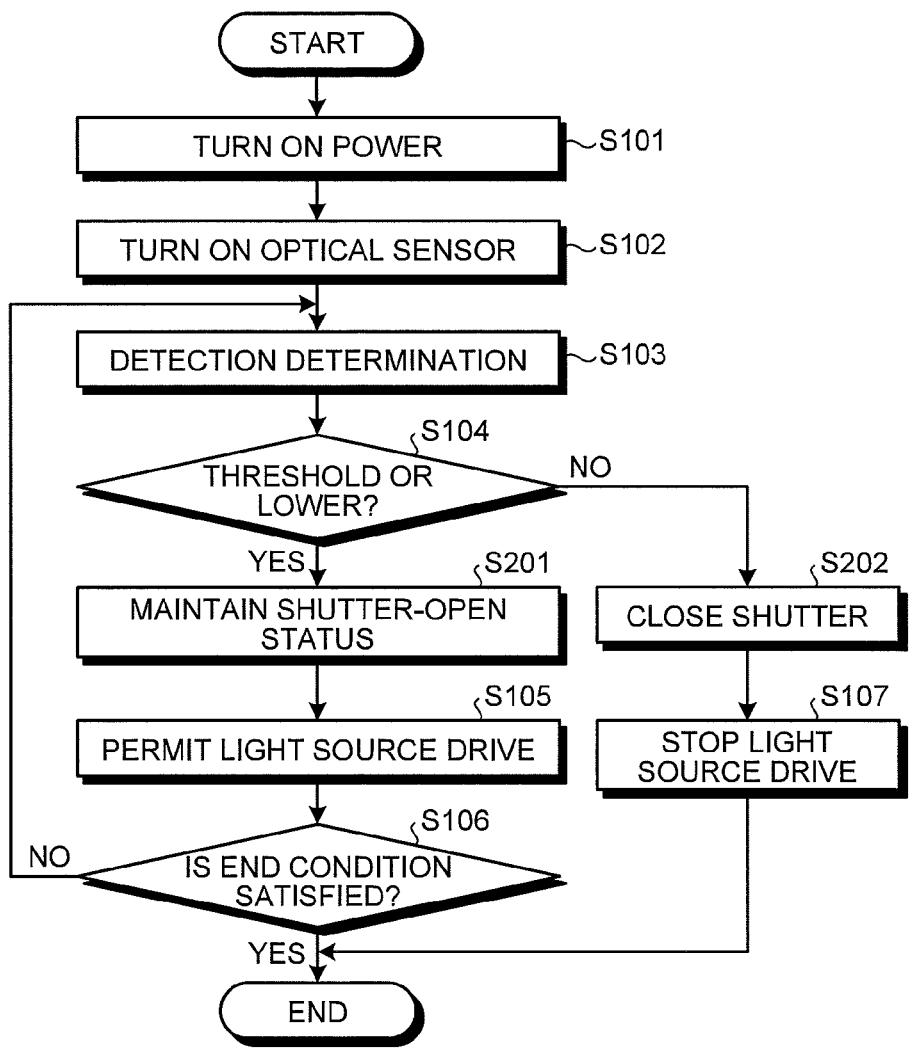
FIG. 18 is a flowchart illustrating a flow of a control action by a central controller according to the second embodiment.

Managing operation by the central controller 180-2 is described with reference to the flowchart in FIG. 18. The second embodiment is different from FIG. 11, which is the flowchart of the first embodiment, in that Step S201 and Step S202 are added. The other steps are the same as those in FIG.

11 and are referred to as the same reference numerals, and the description thereof is omitted.

In the present embodiment, if the level of the photoelectric conversion signal is at the threshold or lower (Yes at Step S104), it is determined that the microlens array 152 is present, and the shutter drive controller 183 causes the shutter to be open (Step S201) and causes the optical path to be an open state.

After this, in the same manner as the first embodiment, the light source drive managing unit 182 permits the operation of the light source drive unit 116 (Step S105).

At Step S104, if the level of the photoelectric conversion signal exceeds the threshold (No at Step S104), it is regarded that the microlens array 152 fails to be detected for any reasons.

In this case, the shutter drive controller 183 closes the shutter 135 (Step S202).

Figure 19:
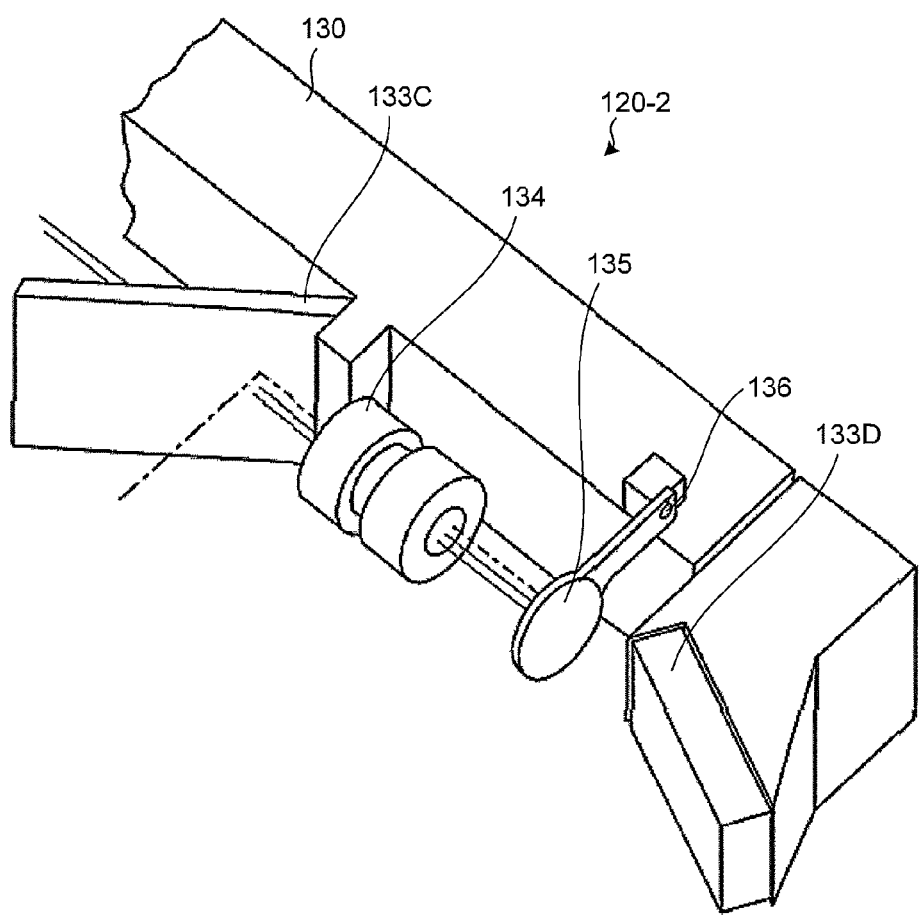
FIG. 19 is a diagram illustrating a state in which the shutter according to the second embodiment is closed.

FIG. 19 illustrates a state in which the shutter is closed. Owing to this, even if a laser is being emitted from the semiconductor laser diodes 132R, 132G, and 132B, the light is immediately blocked by the shutter 135 and does not reach the eyes of the user. After this, the light source drive managing unit 182 may stop the operation of the light source drive unit 116 (Step S107).

The second embodiment having the above constitution produces the following effect.

The present embodiment detects the presence or absence of the microlens array 152, and when the microlens array 152 is absent, the shutter 135 is closed.

This causes only the light subjected to the diffusion by the microlens array 152 to enter the eye and prevents the light not subjected to the diffusion from entering the eye.

Thus, even in the unlikely event that the microlens array 152 has dropped off due to some mode of use, the laser light does not impose an excessive burden on the eye.

Fourth Modification

Although the above embodiment exemplifies the constitution in which the shutter oscillates and the shutter thereby enters and leaves the optical path, it goes without saying that the structure and drive mechanism of the shutter are not limited to this.

Figure 20:
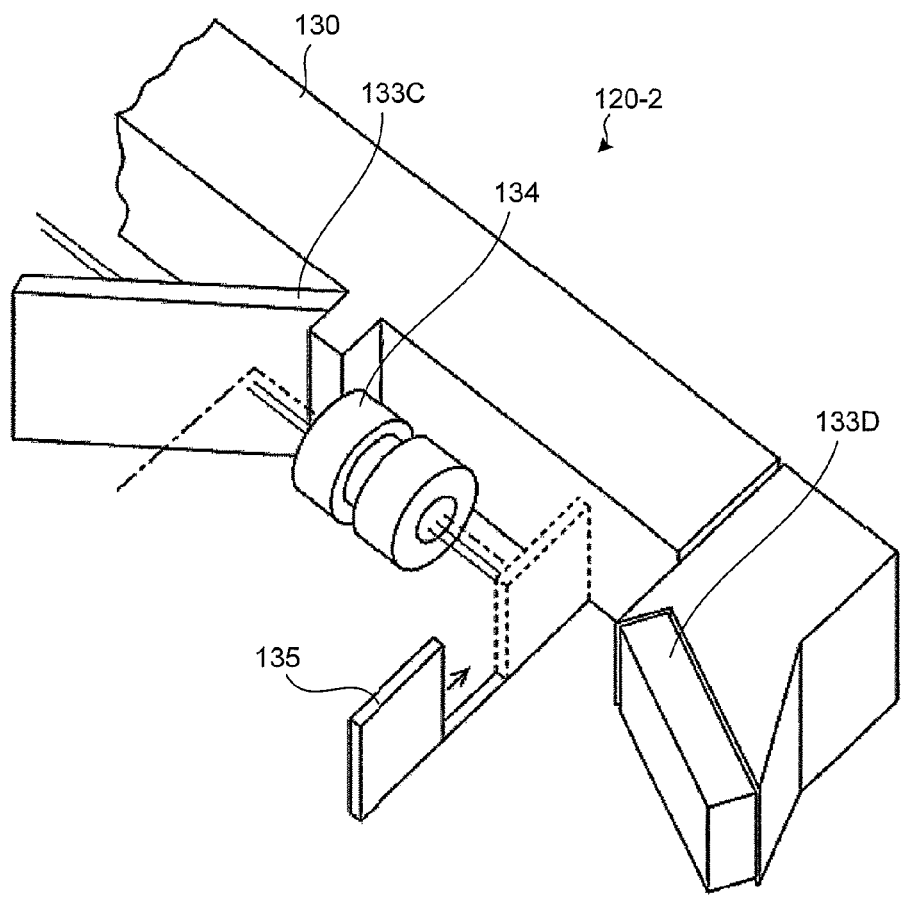
FIG. 20 is a diagram illustrating a modification to the shutter according to the second embodiment.

As illustrated in FIG. 20, for example, the shutter may be opened and closed by a slide mechanism. Although not illustrated, it is understood that shutter mechanisms and aperture mechanisms generally used in cameras may be used.

Such shutter mechanisms and aperture mechanisms are disclosed in, for example, Japanese Patent Application Laid-open No. 6-98216, Japanese Patent Application Laid-open No. 2001-66659, and Japanese Patent Application Laid-open No. 8-220592.

Fifth Modification

It is understood that the position at which the shutter is arranged may be anywhere on the optical path from the semiconductor laser diodes 132R, 132G, and 132B to the retina.

The shutter may be arranged between the scanning mirror unit 200 and the microlens array 152 and the shutter may be arranged inside the imaging optical system 150. In FIG. 7, the shutter may be arranged at a position immediately before the laser light is emitted to the outside such as between the concave mirror 154 and the windshield 11.

It is preferable that the shutter is arranged upstream of the scanning mirror unit 200 as in the above embodiment, because the shutter can be downsized.

Sixth Embodiment

Although the above embodiment blocks the light by the shutter, the light may be weakened without being perfectly blocked. Examples of the means for weakening the light may include filters that absorb the light to reduce its amount of transmission.

A color filter may be used as the shutter. This constitution colors the light when the shutter is closed, and the user easily recognizes that an abnormality has occurred.

When the shutter is a filter, a message image may be displayed that indicates a failure (abnormality) with reduced brightness by closing the filter. After this, all light emissions of the semiconductor laser diodes 132R, 132G, and 132B may be stopped.

Seventh Modification

The first modification to the first embodiment can also be applied to the second embodiment.

Eighth Modification

The above embodiment describes the constitution in which the opening/closing operation of the shutter is managed by the central controller 180-2.

As an eighth modification, the output signal from the detector 146 may directly control the opening/closing operation of the shutter without the involvement of the central controller 180-2.

Figure 21:
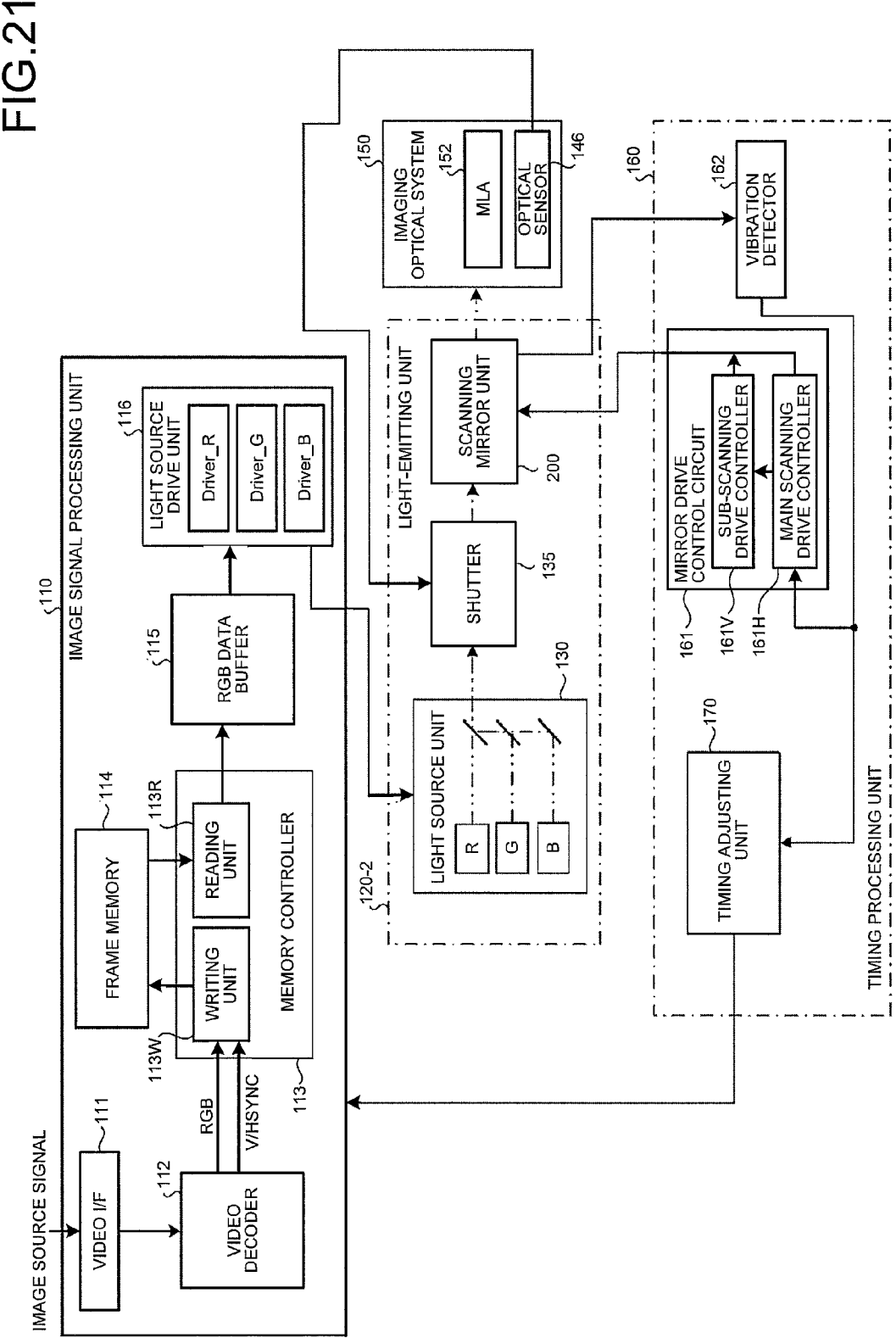
FIG. 21 is a diagram illustrating an eighth modification.

As illustrated in FIG. 21, for example, the output signal of the optical sensor (detector) 146 directly opens and closes the shutter 135. In other words, the output signal of the optical sensor (detector) 146 directly controls a drive motor of the shutter.

When the presence of the microlens array 152 fails to be detected, the shutter is closed to block the light.

Ninth Modification

The third modification to the first embodiment can also be applied to the second embodiment.

The present invention is not limited to the above embodiments and can be appropriately modified without departing from the concept of the present invention.

The exit pupil enlarger is not limited to the microlens array 152 and may be anything having the same effect; it may be, for example, a microsphere, a nanosphere, a light diffuser, a holographic enlarger, a diffraction grating, or any combination of two or more of these.

It is understood that the installation mode of the exit pupil enlarger is not limited to FIG. 8 and FIG. 17.

Although the above description exemplifies as the scanning mirror unit the MEMS mirror that can be integrally biaxially driven, various modifications can be made without being limited to the above examples, such as a mirror oscillating in the horizontal direction and a mirror oscillating in the vertical direction being separated.

It goes without saying that the image display apparatus is not only applicable to the vehicle-mounted type as the head up display, but also applicable to head mount displays incorporated into a helmet or glasses, or the like, or to front projectors, for example.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image display apparatus, comprising:
 a light source unit configured to output a light beam;
 a light source drive unit configured to drive the light source unit based on input image data;

a scanning mirror unit configured to reflect the light beam from the light source unit so as to raster scan the light beam by being driven in a main scanning direction and a sub-scanning direction;

an exit pupil enlarger that is arranged on an optical path of the light beam output from the light source unit;

a detector configured to detect whether the exit pupil enlarger is present on the optical path, and a shutter configured to enter and leave the optical path in accordance with a detection result of the exit pupil enlarger by the detector.

2. The image display apparatus according to claim 1, wherein, when the detector fails to detect the presence of the exit pupil enlarger, the shutter is inserted into the optical path.

3. The image display apparatus according to claim 1, wherein
the light source unit is configured to output the light beam by causing a light-emitting element to emit light, and
the shutter is arranged between the light-emitting element and the scanning mirror unit.

4. The image display apparatus according to claim 1, wherein the shutter is a light-blocking member configured to block light.

5. The image display apparatus according to claim 1, wherein the shutter is a filter configured to reduce an amount of light transmission.

6. The image display apparatus according to claim 1, wherein the shutter is a color filter.

7. The image display apparatus according to claim 1, wherein the shutter is put into an open state only when the detector successfully detects the presence of the exit pupil enlarger.

8. A method for controlling an image display apparatus that comprises an exit pupil enlarger arranged on an optical path of a light beam output from a light source unit, the method comprising:

detecting whether the exit pupil enlarger is present on the optical path;

arranging a shutter so that it can enter and leave the optical path in accordance with a detection result of the exit pupil enlarger;

when the presence of the exit pupil enlarger is successfully detected, putting the shutter into an open state, driving the light source unit based on input image data to output a light beam, reflecting the light beam from the light source unit so as to raster scan the light beam by driving a scanning mirror unit in a main scanning direction and a sub-scanning direction, and displaying an image based on the input image data; and when the presence of the exit pupil enlarger fails to be detected, inserting the shutter into the optical path, reducing intensity of the light beam from the light source unit compared with a case when the presence of the exit pupil enlarger is successfully detected, or outputting no light beam from the light source unit.

* * * * *